US011687282B2

(12) United States Patent
Gunasekaran et al.

(10) Patent No.: US 11,687,282 B2
(45) Date of Patent: *Jun. 27, 2023

(54) TIME TO LIVE FOR LOAD COMMANDS (71) Applicant: Micron Technology, Inc., Boise, ID (US)

(72) Inventors: Shivasankar Gunasekaran, Folsom, CA (US); Samuel E. Bradshaw, Sacramento, CA (US); Justin M. Eno, El Dorado Hills, CA (US); Ameen D. Akel, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,981

(22) Filed: Apr. 21, 2021

(65) Prior Publication Data

US 2021/0240398 A1 Aug. 5, 2021

Related U.S. Application Data (63) Continuation of application No. 16/688,250, filed on Nov. 19, 2019, now Pat. No. 11,199,995.

(51) Int. Cl.
*G06F 3/06* (2006.01)
*G06F 12/0873* (2016.01)
*G06F 11/07* (2006.01)

(52) U.S. Cl.
CPC .......... *G06F 3/0659* (2013.01); *G06F 3/0614* (2013.01); *G06F 3/0653* (2013.01); *G06F 3/0679* (2013.01); *G06F 11/0757* (2013.01); *G06F 12/0873* (2013.01)

(58) Field of Classification Search
None
See application file for complete search history.

(56) References Cited

U.S. PATENT DOCUMENTS

| | | | |
|---|---|---|---|
| 5,355,475 | A | 10/1994 | Tanaka et al. |
| 7,694,071 | B1 | 4/2010 | Sidhu et al. |
| 8,321,627 | B1 | 11/2012 | Norrie et al. |
| 8,380,951 | B1 | 2/2013 | Krinke, II et al. |

(Continued)

FOREIGN PATENT DOCUMENTS

EP 3605341 2/2020

OTHER PUBLICATIONS

International Search Report and Written Opinion, PCT/US2020/059843, dated Mar. 3, 2021.

(Continued)

*Primary Examiner* — Kevin Verbrugge
(74) *Attorney, Agent, or Firm* — Greenberg Traurig (57) ABSTRACT A memory sub-system configured to be responsive to a time to live requirement for load commands from a processor. For example, a load command issued by the processor (e.g., SoC) can include, or be associated with, an optional time to live parameter. The parameter requires that the data at the memory address be available within the time specified by the time to live parameter. When the requested data is currently in the lower speed memory (e.g., NAND flash) and not available in the higher speed memory (e.g., DRAM, NVRAM), the memory sub-system can determine that the data cannot be made available with the specified time and optionally skip the operations and return an error response immediately.

20 Claims, 5 Drawing Sheets

(56) References Cited

U.S. PATENT DOCUMENTS

| | | |
|---|---|---|
| 9,740,485 B2 | 8/2017 | Mirichigni et al. |
| 9,754,648 B2 | 9/2017 | Mirichigni et al. |
| 9,823,968 B1 | 11/2017 | Fugini et al. |
| 9,952,850 B2 | 4/2018 | Joshi et al. |
| 10,067,764 B2 | 9/2018 | Mirichigni et al. |
| 10,163,472 B2 | 12/2018 | Mirichigni et al. |
| 11,199,995 B2 | 12/2021 | Gunasekaran et al. |
| 11,243,804 B2 | 2/2022 | Eno |
| 2005/0249060 A1 | 11/2005 | Arashi et al. |
| 2005/0262323 A1 | 11/2005 | Woo et al. |
| 2006/0031565 A1 | 2/2006 | Iyer et al. |
| 2006/0253675 A1 | 11/2006 | Johannes Bloks |
| 2007/0290993 A1 | 12/2007 | Baudisch et al. |
| 2008/0016308 A1 | 1/2008 | Bartley et al. |
| 2008/0091906 A1 | 4/2008 | Brittain et al. |
| 2010/0318691 A1 | 12/2010 | Kitagawa |
| 2010/0329052 A1 | 12/2010 | Chen et al. |
| 2011/0179414 A1 | 7/2011 | Goggin et al. |
| 2014/0122814 A1 | 5/2014 | Mirichigni et al. |
| 2014/0122822 A1 | 5/2014 | Mirichigni et al. |
| 2014/0297971 A1 | 10/2014 | Oe et al. |
| 2014/0340974 A1 | 11/2014 | Wang et al. |
| 2014/0365706 A1 | 12/2014 | Tanaka et al. |
| 2016/0070483 A1 | 3/2016 | Yoon et al. |
| 2016/0203046 A1 | 7/2016 | Hanafusa |
| 2017/0115891 A1 | 4/2017 | O'Krafka et al. |
| 2017/0212840 A1 | 7/2017 | Le et al. |
| 2017/0308382 A1 | 10/2017 | Mirichigni et al. |
| 2017/0309318 A1 | 10/2017 | Mirichigni et al. |
| 2018/0081563 A1 | 3/2018 | Roberts |
| 2018/0095675 A1 | 4/2018 | Kachare et al. |
| 2019/0012173 A1 | 1/2019 | Mirichigni et al. |
| 2019/0079676 A1 | 3/2019 | Seo et al. |
| 2019/0080733 A1 | 3/2019 | Mirichigni et al. |
| 2020/0065240 A1 | 2/2020 | Choi |
| 2020/0133567 A1 | 4/2020 | Hutchison et al. |
| 2021/0011649 A1 | 1/2021 | Doshi et al. |
| 2021/0149595 A1 | 5/2021 | Gunasekaran et al. |
| 2021/0149711 A1 | 5/2021 | Eno |
| 2022/0107835 A1 | 4/2022 | Eno |

OTHER PUBLICATIONS

International Search Report and Written Opinion, PCT/US2020/059844, dated Mar. 5, 2021.

TIME TO LIVE FOR LOAD COMMANDS

RELATED APPLICATIONS

The present application is a continuation application of U.S. patent application Ser. No. 16/688,250, filed Nov. 19, 2019 and entitled "Time to Live for Load Commands," the entire disclosure of which application is hereby incorporated herein by reference.

TECHNICAL FIELD

At least some embodiments disclosed herein relate to memory systems in general, and more particularly, but not limited to time to live for load commands.

BACKGROUND

A memory sub-system can include one or more memory components that store data. A memory sub-system can be a data storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

A host system can communicate with a memory sub-system in accordance with a pre-defined communication protocol, such as Non-Volatile Memory Host Controller Interface Specification (NVMHCI), also known as NVM Express (NVMe), which specifies the logical device interface protocol for accessing non-volatile memory via a Peripheral Component Interconnect Express (PCI Express or PCIe) bus. In accordance with the communication protocol, the host system can send commands of different types to the memory sub-system; and the memory sub-system can execute the commands and provide responses to the commands. Some commands instruct the memory sub-system to store data items at addresses specified in the commands, or to retrieve data items from addresses specified in the commands, such as read commands and write commands. Some commands manage the infrastructure in the memory sub-system and/or administrative tasks, such as commands to manage namespaces, commands to attach namespaces, commands to create input/output submission or completion queues, commands to delete input/output submission or completion queues, commands for firmware management, etc.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to time to live for load commands to access data or instructions at memory addresses specified by a processor.

For example, a load command issued by a processor (e.g., SoC) can be configured to include, or be associated with, an optional time to live parameter that requires the data at the memory address to be available within the time specified by the time to live parameter. The technique can improve the efficiency of the processor in accessing memory have different speeds.

For example, when the requested data is currently in the lower speed memory (e.g., NAND flash) and not available in the higher speed memory (e.g., DRAM, NVRAM), the processor can receive a response (e.g., not available at the requested time to live) instead of having to wait for the completion of the load operation on the low speed memory. When the memory sub-system determines that the data cannot be made available with the specified time, the memory sub-system can skip the operations and return an error response.

Optionally, such the error response can cause the memory sub-system to load the data from the lower speed memory (e.g., NAND flash) to the higher speed memory (e.g., DRAM, NVRAM). Therefore, the subsequent memory access request can be fulfilled with time to live requirement. Such memory load operations with a time to live requirement provides the processor with the flexibility to optionally skip the processing of certain non-critical data (e.g., temporarily) without having to wait for an excessive amount of time. When the processing of the requested data is required or desirable, the processor can optionally relax the time to live parameter.

Optionally, the processor and/or the memory can have a register to store a time to live parameter. Load instructions can be translated from a logical address space to a physical address space and combined with the time to live parameter for a load command to the memory sub-system.

Figure 1:
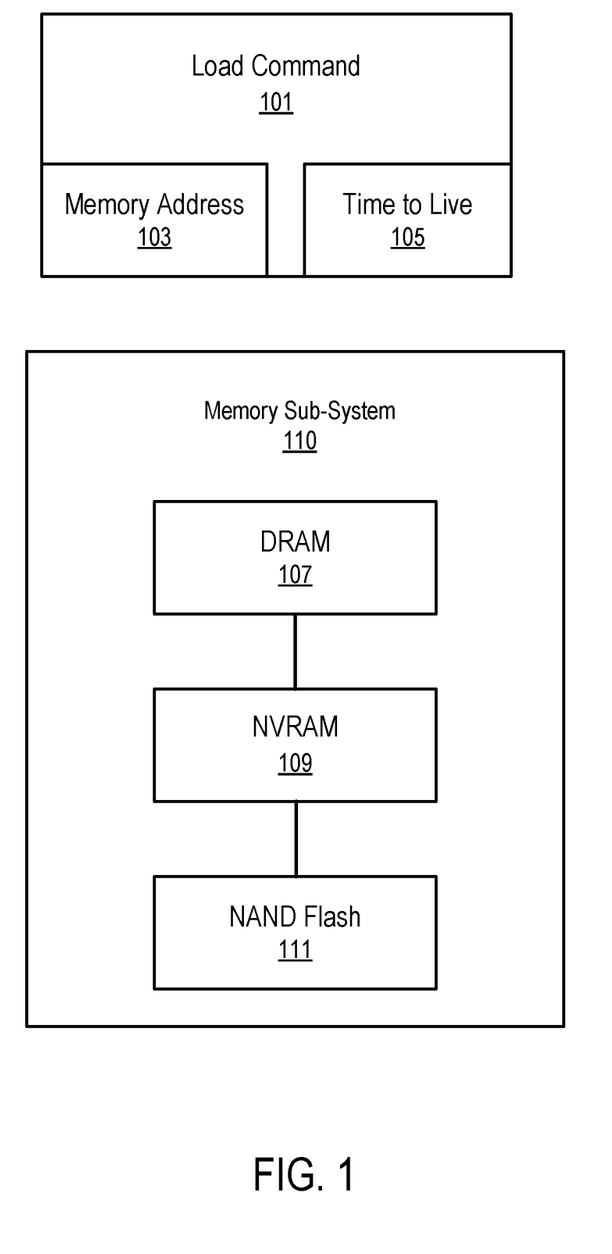
FIG. 1 shows a system having time to live for load data from a memory sub-system.

FIG. 1 shows a system having time to live for load data from a memory sub-system 110. In FIG. 1, the memory sub-system 110 have different types of memory, such as dynamic random access memory (DRAM) 107, non-volatile random access memory (NVRAM) 109, and/or NAND flash memory (111). The different types of memory in the memory sub-system 110 can be addressed with a load command 101 specifying the memory address 103 and a time to live requirement 105. In some implementations, the time to live requirement 105 is specified in the load command/instruction 101 from a processor (e.g., a System on Chip (SoC) or a central processing unit (CPU)). In other implementations, a register is used to store the time to live requirement 105; and the content of the register can be updated to adjust the time to live requirement 105 for the load commands/instructions that are received in the memory sub-system 110.

For example, a load command 101 issued by a processor (e.g., System on Chip) (e.g., processing device 418 illustrated in FIG. 4) can be configured to include an optional time to live parameter 105 that requires the data at the memory address 103 to be available within the time specified by the time to live parameter 105. For example, the memory address 103 in the load command can be initially mapped by the memory sub-system 110 to the lower speed memory (e.g., NAND flash 111). Thus, the data requested at the memory address is not available in the higher speed memory (e.g., DRAM 107, NVRAM 109). When the memory sub-system 110 determines that the data cannot be made available to the processing with the specified time, the memory sub-system 110 can skip the operations and return an error response. Optionally, such the error response can cause the memory sub-system 110 to load the data from the lower speed memory (e.g., NAND flash 111) to the higher speed memory (e.g., DRAM 107, NVRAM 109) (e.g., to buffer the data in the higher speed memory, to cache the data in the higher speed memory, or to remap the memory address to the higher speed memory by swapping a page of memory addresses from the lower speed memory to the higher speed memory). Optionally, the error response can include an estimated time the data at the memory address 103 will become available. Therefore, the subsequent memory access request can be fulfilled under the time to live parameter requirement 105.

When the processor receives such an error response, the processor can optionally postpone the processing of the data/instruction at the memory address 103 (e.g., when the data/instruction is non-critical). Thus, the processor can reissue the load command 101 after a period of time, with the anticipation that the memory sub-system 110 is likely to make arrangements to make the data/instruction available under the time to live requirement 105. For example, the memory sub-system 110 can make the arrangements through buffering, caching, and/or changing a memory address map that maps the memory address (103) to a physical memory address of a memory unit in the memory sub-system 110.

Optionally, the processor can relax the time to live parameter 105 in response to the error response generated for a prior tighter time to live request (e.g., when the immediate processing of the requested data is required or desirable for the memory address 103).

Optionally, the processor can write the time to live parameter 105 into a register in the memory sub-system 110 to specify the time to live requirement. Thus, the load command 101 does not have to explicitly include a field for the time to live parameter 105.

Optionally, the processor has a register storing the time to live parameter 105. When a load instruction containing a logical memory address from the processor is converted into a load command by a memory controller (e.g., 416 illustrated in FIG. 4), the memory controller translates the logical memory address into a physical memory address in the load command and add the time to live parameter 105 to the load command 101 that is transmitted to the memory sub-system 110.

Figure 2:
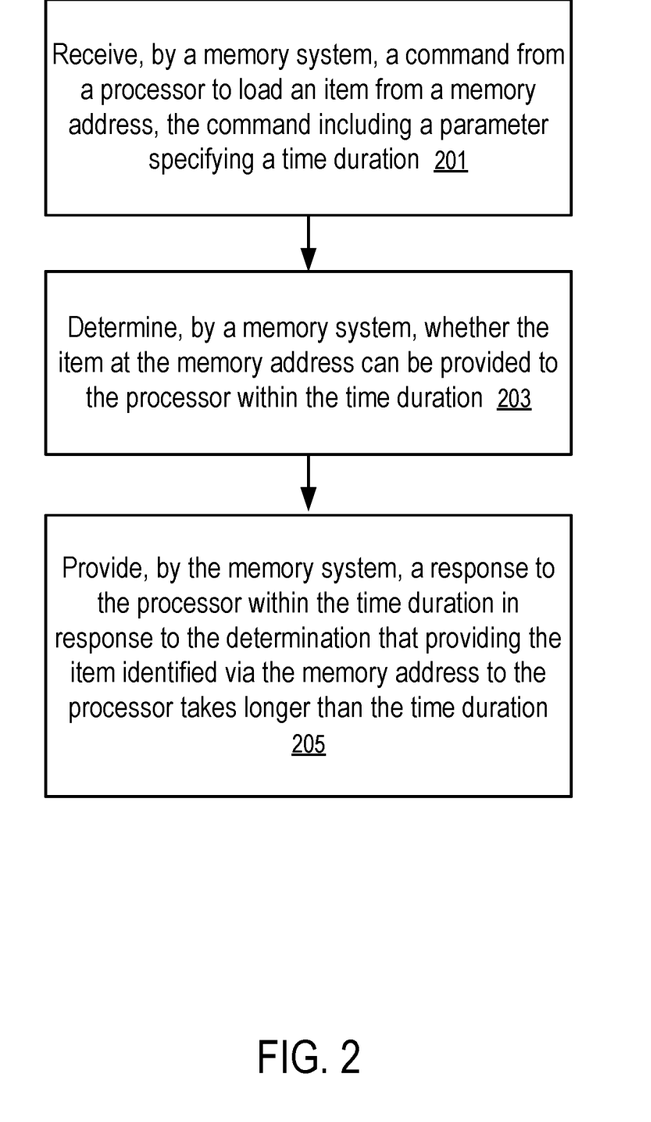
FIG. 2 illustrates a method of implementing time to live for load data from memory.

FIG. 2 illustrates a method of implementing time to live for load data from memory. For example, the method of FIG. 2 can be performed in a system of FIG. 1 and, in general, by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 201, a memory sub-system 110 can receive a load command 101 from a processor to load an item from a memory address 103. For example, the command can include a time to live parameter 105 specifying a time duration.

At block 203, the memory sub-system 110 can determine whether the item at the memory address 103 can be provided to the processor within the time duration. For example, the memory address can locate at a media unit (e.g., 107, 109, or 111) among the multiple media units 107 to 111. For example, if the memory address 103 of the data is in the high-speed type of memory device (e.g., DRAM 107, NVRAM 109), then the data can be provided to the processor within the time duration. However, if the memory address 103 of the data is in the low-speed type of memory device (e.g., NAND Flash 111), then the data cannot be provided to the processor within the time duration.

At block 205, when the memory sub-system 110 determines that providing the item identified via the memory address 103 to the processor takes longer than the time duration, for example, the memory sub-system 110 can provide a response to the processor within the time duration. For example, when the memory sub-system 110 determines that the data cannot be made available with the specified time, the memory sub-system 110 can skip the operations and return an error response.

Figure 3:
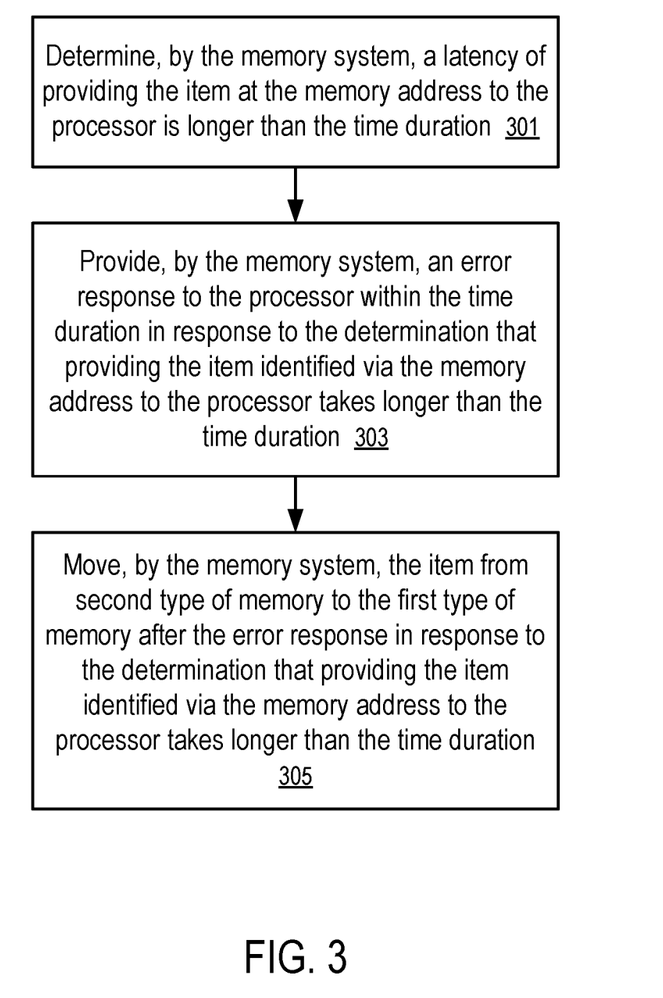
FIG. 3 shows another method of implementing time to live for load data from memory.

FIG. 3 shows another method of implementing time to live for load data from memory. For example, the method of FIG. 3 can be performed in a system of FIG. 1 and, in general, by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, a memory sub-system 110 can determine a latency of providing the item at the memory address 103 to the processor is longer than the time duration. For example, the command 101 can include a time to live parameter 105 specifying a time duration. For example, if the memory address 103 of the data is in the low speed type of memory device (e.g., NAND Flash 111), then the data cannot be provided to the processor within the time duration.

At block 303, when the memory sub-system 110 determines that providing the item identified via the memory address 103 to the processor takes longer than the time duration, for example, the memory sub-system 110 can provide an error response to the processor within the time duration. For example, when the memory sub-system 110 determines that the data cannot be made available with the specified time, the memory sub-system 110 can skip the operations and return an error response.

At block 305, when the memory sub-system 110 determines that providing the item identified via the memory address 103 to the processor takes longer than the time duration, for example, the memory sub-system 110 can provide an error response to the processor within the time duration. After the memory sub-system 110 receives the error response, for example, such the error response can cause to the memory sub-system 110 to load/move the data from the lower speed memory (e.g., NAND flash 111) to the higher speed memory (e.g., DRAM 107, NVRAM 109).

Figure 4:
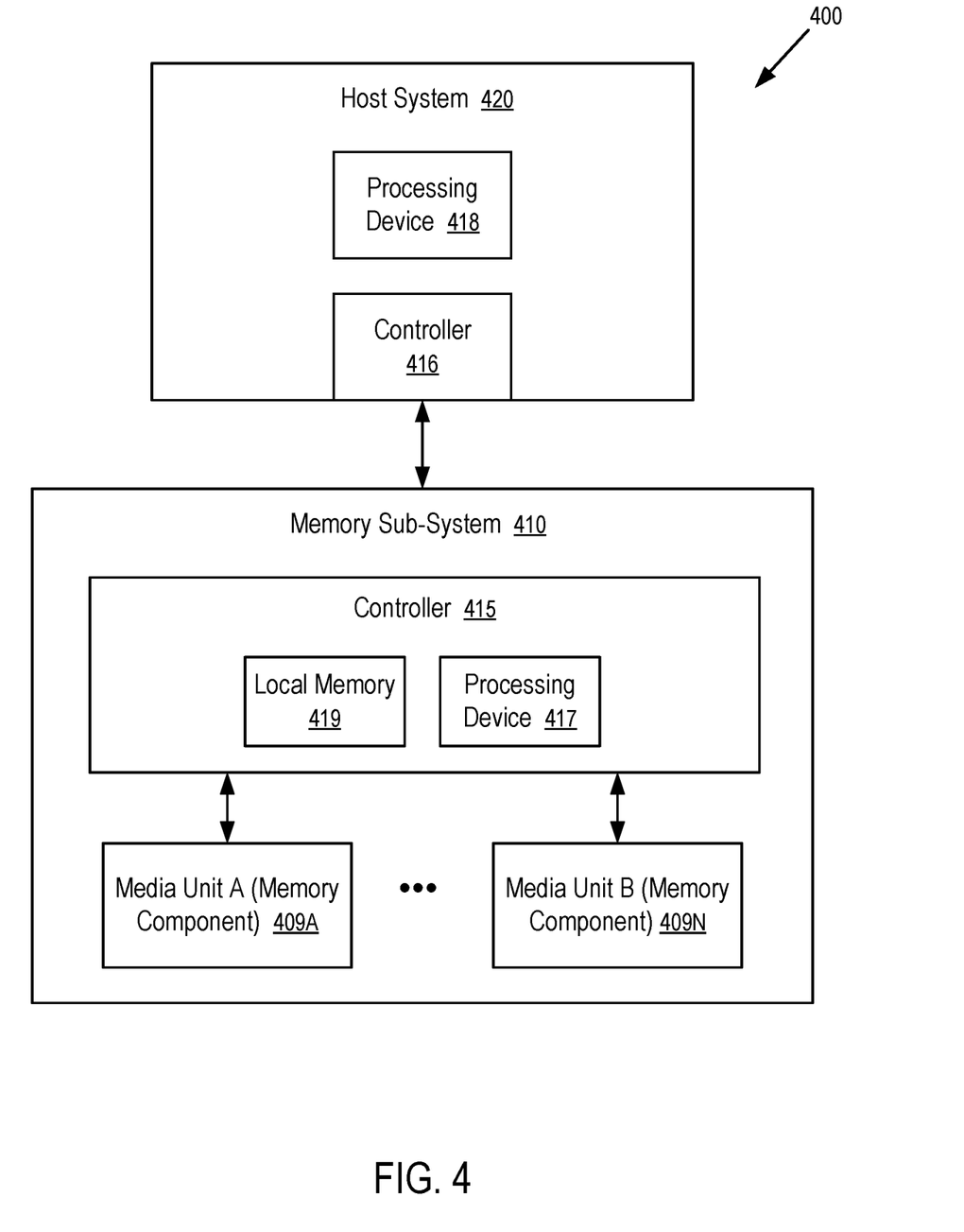
FIG. 4 illustrates an example computing system in which time to live techniques can be implemented.

FIG. 4 illustrates an example computing system in which time to live techniques can be implemented. For example, the time to live requirement 105 of FIG. 1 can be imposed upon the time period between a memory sub-system 410 receiving a load command 101 and the memory sub-system 410 providing the data retrieved at the memory address 103 specified in the load command 101.

In general, a memory sub-system can also be referred to as a "memory device." An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc.

Another example of a memory sub-system is a data memory/system that is connected to the central processing unit (CPU) via a peripheral interconnect (e.g., an input/output bus, a storage area network). Examples of memories include a solid-state drive (SSD), a flash drive, a universal serial bus (USB) flash drive, and a hard disk drive (HDD).

In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

The memory sub-system 410 can include media, such as media units/memory components 409A to 409N. In general, the media units/memory components 409A to 409N can be volatile memory components, non-volatile memory components, or a combination of such. Each of the media units/memory components 409A to 409N can perform operations to store, record, program, write, or commit new data independent of the operations of other media units/memory components 409A to 409N. Thus, the media units/memory components 409A to 409N can be used in parallel in executing write commands. In some embodiments, the memory sub-system is a storage system. An example of a storage system is a solid state drive (SSD). In some embodiments, the memory sub-system 410 is a memory module. Examples of a memory module includes a DIMM, NVDIMM, and NVDIMM-P. In some embodiments, the memory sub-system 410 is a hybrid memory/storage sub-system. In general, the computing environment can include a host system 420 that uses the memory sub-system 410. For example, the host system 420 can write data to the memory sub-system 410 and read data from the memory sub-system 410.

The host system 420 can be a computing device such as a desktop computer, laptop computer, network server, mobile device, or such computing device that includes a memory and a processing device. The host system 420 can include or be coupled to the memory sub-system 410 so that the host system 420 can read data from or write data to the memory sub-system 110. The host system 420 can be coupled to the memory sub-system 410 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 420 and the memory sub-system 410. The host system 420 can further utilize an NVM Express (NVMe) interface to access the memory components 409A to 409N when the memory sub-system 410 is coupled with the host system 420 by the PCIe interface. The physical host interface can provide an interface for passing control, address, data, and other signals between the memory sub-system 410 and the host system 420. FIG. 4 illustrates a memory sub-system 410 as an example. In general, the host system 420 can access multiple memory sub-systems via a same communication connection, multiple separate communication connections, and/or a combination of communication connections.

The host system 420 includes a processing device 418 and a controller 416. The processing device 418 of the host system 420 can be, for example, a microprocessor, a central processing unit (CPU), a processing core of a processor, an execution unit, etc. In some instances, the controller 416 can be referred to as a memory controller, a memory management unit, and/or an initiator. In one example, the controller 416 controls the communications over a bus coupled between the host system 420 and the memory sub-system 410.

In general, the controller 416 can send commands or requests to the memory sub-system 410 for desired access to memory components 409A to 409N. The controller 416 can further include interface circuitry to communicate with the memory sub-system 410. The interface circuitry can convert responses received from the memory sub-system 410 into information for the host system 420.

The controller 416 of the host system 420 can communicate with the controller 415 of the memory sub-system 410 to perform operations such as reading data, writing data, or erasing data at the memory components 409A to 409N and other such operations. In some instances, the controller 416 is integrated within the same package of the processing device 418. In other instances, the controller 416 is separate from the package of the processing device 418. The controller 416 and/or the processing device 418 can include hardware such as one or more integrated circuits and/or discrete components, a buffer memory, a cache memory, or a combination thereof. The controller 416 and/or the processing device 418 can be a microcontroller, special purpose logic circuitry (e.g., a field programmable gate array (FPGA), an application specific integrated circuit (ASIC), etc.), or another suitable processor.

In general, the media units/memory components 409A to 409N can include any combination of the different types of non-volatile memory components and/or volatile memory components. An example of non-volatile memory components includes a negative-and (NAND) type flash memory. Each of the memory components 409A to 409N can include one or more arrays of memory cells such as single level cells (SLCs) or multi-level cells (MLCs) (e.g., triple level cells (TLCs) or quad-level cells (QLCs)). In some embodiments, a specific memory component can include both an SLC portion and an MLC portion of memory cells. Each of the memory cells can store one or more bits of data (e.g., data blocks) used by the host system 420. Although non-volatile memory components such as NAND type flash memory are described, the memory components 409A to 409N can be based on any other type of memory such as a volatile memory. In some embodiments, the memory components 409A to 409N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 409A to 409N can be grouped as memory pages or data blocks that can refer to a unit of the memory component used to store data.

The controller 415 of the memory sub-system 410 can communicate with the memory components 409A to 409N to perform operations such as reading data, writing data, or erasing data at the memory components 409A to 409N and other such operations (e.g., in response to commands scheduled on a command bus by controller 416). The controller 415 can include hardware such as one or more integrated circuits and/or discrete components, a buffer memory, or a combination thereof. The controller 415 can be a microcontroller, special purpose logic circuitry (e.g., a field programmable gate array (FPGA), an application specific integrated circuit (ASIC), etc.), or another suitable processor. The controller 415 can include a processing device 417 (processor) configured to execute instructions stored in local memory 419. In the illustrated example, the local memory 419 of the controller 415 includes an embedded memory configured to store instructions for performing various processes, operations, logic flows, and routines that control operation of the memory sub-system 410, including handling communications between the memory sub-system 410 and the host system 420. In some embodiments, the local memory 419 can include memory registers storing memory pointers, fetched data, etc. The local memory 419 can also include read-only memory (ROM) for storing micro-code. While the example memory sub-system 410 in FIG. 4 has been illustrated as including the controller 415, in another embodiment of the present disclosure, a memory sub-system 410 cannot include a controller 415, and can instead rely upon external control (e.g., provided by an external host, or by a processor or controller separate from the memory sub-system).

In general, the controller 415 can receive commands or operations from the host system 420 and can convert the commands or operations into instructions or appropriate commands to achieve the desired access to the memory components 109A to 409N. The controller 415 can be responsible for other operations such as wear leveling operations, garbage collection operations, error detection and error-correcting code (ECC) operations, encryption operations, caching operations, and address translations between a logical block address and a physical block address that are associated with the memory components 409A to 409N. The controller 415 can further include host interface circuitry to communicate with the host system 420 via the physical host interface. The host interface circuitry can convert the commands received from the host system into command instructions to access the memory components 409A to 409N as well as convert responses associated with the memory components 409A to 409N into information for the host system 420.

The memory sub-system 410 can also include additional circuitry or components that are not illustrated. In some embodiments, the memory sub-system 410 can include a cache or buffer (e.g., DRAM) and address circuitry (e.g., a row decoder and a column decoder) that can receive an address from the controller 415 and decode the address to access the memory components 409A to 409N.

Figure 5:
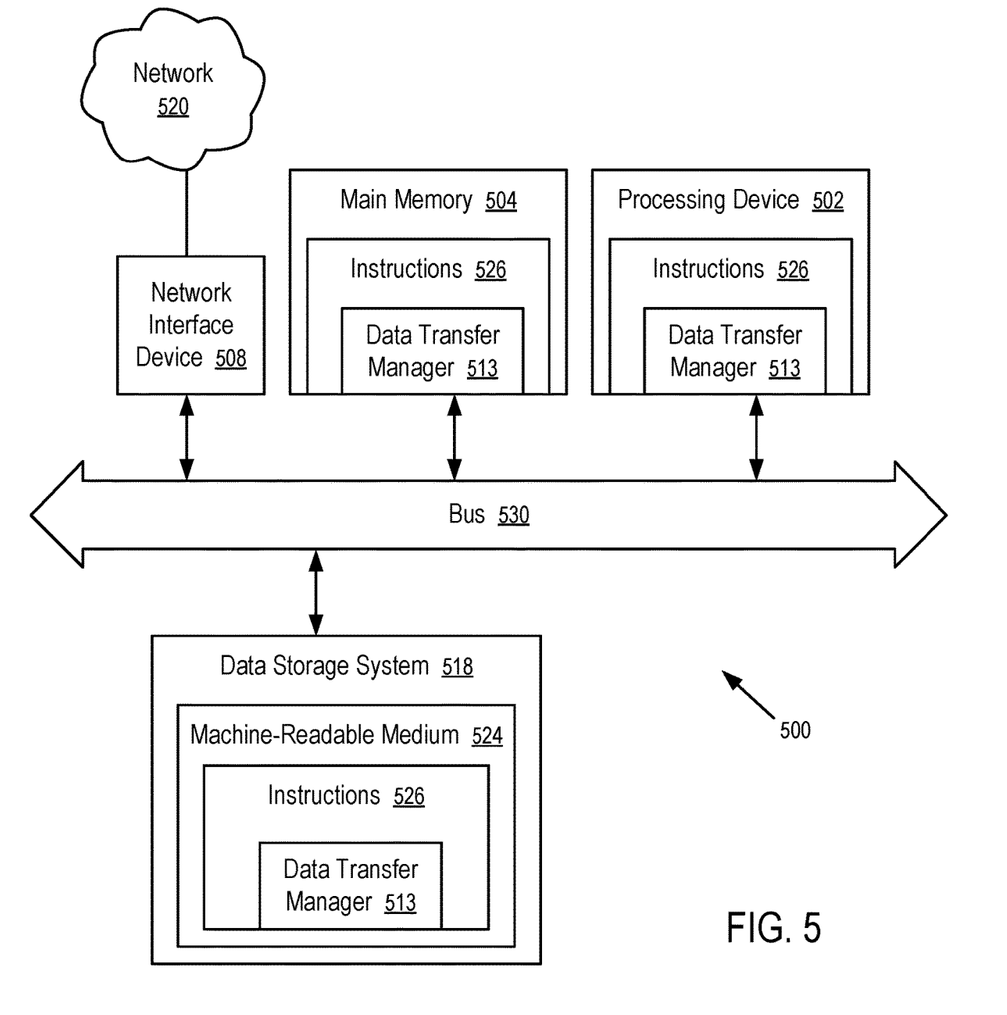
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed.

For example, at least some of operations configured to implement the time to live requirement and/or configured to implement a response according to the time to live requirement can be implemented using instructions stored as a data transfer manager 513.

In some embodiments, the computer system 500 can correspond to a host system (e.g., the host system 420 of FIG. 4) that includes, is coupled to, or utilizes a memory sub-system (e.g., the memory sub-system 410 of FIG. 4) or can be used to perform the operations of a data transfer manager 513 (e.g., to execute instructions to perform operations described with reference to FIGS. 1-4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 518, which communicate with each other via a bus 530 (which can include multiple buses).

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 410 of FIG. 4.

In one embodiment, the instructions 526 include instructions to implement functionality corresponding to a data transfer manager 513 (e.g., to execute instructions to perform operations described with reference to FIGS. 1-4). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a host interface of a memory module operable on a memory bus to receive a load command from a central processing unit, the load command specifying a memory address and a requested time duration for responding to the load command;
   a plurality of memory devices having different latencies in accessing data stored in the memory devices; and
   a controller coupled to the host interface and the memory devices, wherein the controller is configured to, in response to the load command, at least:
      identify a memory device, among the plurality of memory devices, that currently stores an item at the memory address; and
      determine whether a latency of the memory device is sufficient to retrieve the item from the memory device as a response to the load command within the requested time duration.

2. The apparatus of claim 1, wherein the controller comprises one or more processors.

3. The apparatus of claim 2, wherein the controller is configured via one or more sequences of instructions executable by the one or more processors.

4. The apparatus of claim 1, wherein the controller is configured to, in response to a determination that the latency of the memory device is insufficient to retrieve the item from the memory device within the requested time duration, provide the response to the load command within the requested time duration; and the response is configured to indicate that the item is not available within the time duration.

5. The apparatus of claim 4, wherein the plurality of memory devices include a first memory device having a first type of memory and a second memory device having a second type of memory; and data stored in the second memory device is accessed via the first memory device.

6. The apparatus of claim 5, wherein the first type of memory and the second type of memory include dynamic random access memory, non-volatile random access memory, or flash memory, or any combination thereof.

7. The apparatus of claim 4, wherein the memory device is a first memory device; and the controller is configured to, after the response to the load command, move the item into a second memory device among the plurality of memory devices.

8. The apparatus of claim 1, wherein the load command includes a parameter representative of the requested time duration; and the controller is configured to extract the parameter from the command to determine the requested time duration.

9. A method, comprising:
   receiving, from a memory bus connected to a host interface of a memory module having a plurality of memory devices with different latencies in accessing data stored in the memory devices, a load command from a central processing unit, the load command specifying a memory address and a requested time duration for responding to the load command;
   identifying a first memory device, among the plurality of memory devices, that currently stores an item at the memory address; and
   determining whether a latency of the first memory device is sufficient to retrieve the item from the first memory device as a response to the load command within the requested time duration.

10. The method of claim 9, further comprising:
    providing an error response to the central processing unit, responsive to the load command, in response to a determination that the latency of the first memory device is insufficient to retrieve, within the requested time duration, the item from the first memory device.

11. The method of claim 10, wherein the error response is provided within the requested time duration.

12. The method of claim 11, further comprising:
    after providing the error response, storing the item retrieved from the first memory device into a second memory device among the plurality of memory devices, wherein the second memory device has a latency sufficient to meet the requested time duration.

13. The method of claim 12, further comprising:
    extracting, from the load command, a parameter representative of the requested time duration.

14. The method of claim 11, further comprising:
    moving, in response to the load command, the item from the first memory device to a second memory device having a latency shorter than the latency of the first memory device.

15. A non-transitory computer storage medium storing instructions which, when executed in an apparatus having a plurality of memory devices with different latencies in accessing data stored in the memory devices, cause the apparatus to perform a method, the method comprising:
    receiving, from a memory bus connected to a host interface of a memory module, a load command from a central processing unit, the load command specifying a memory address and a requested time duration for responding to the load command;
    identifying a first memory device, among the plurality of memory devices, that currently stores an item at the memory address; and
    determining whether a latency of the first memory device is sufficient to retrieve the item from the first memory device as a response to the load command within the requested time duration.

16. The non-transitory computer storage medium of claim 15,
    wherein the method further comprises:

providing an error response to the central processing unit, responsive to the load command, in response to a determination that the latency of the first memory device is insufficient to retrieve, within the requested time duration, the item from the first memory device.

17. The non-transitory computer storage medium of claim 16, wherein the error response is provided within the requested time duration.

18. The non-transitory computer storage medium of claim 17, wherein the method further comprises:
after providing the error response, storing the item retrieved from the first memory device into a second memory device among the plurality of memory devices, wherein the second memory device has a latency shorter than the latency of the first memory device.

19. The non-transitory computer storage medium of claim 18,
wherein the method further comprises:
extracting, from the load command, a parameter representative of the requested time duration.

20. The non-transitory computer storage medium of claim 17,
wherein the method further comprises:
moving, in response to the load command, the item from the first memory device to a second memory device.

* * * * *